(12) United States Patent
Noguchi et al.

(10) Patent No.: US 12,517,679 B2
(45) Date of Patent: Jan. 6, 2026

(54) MEMORY INTERFACE

(71) Applicant: Taiwan Semiconductor Manufacturing Company, Ltd., Hsinchu (TW)

(72) Inventors: Hiroki Noguchi, Hsinchu (TW); Yih Wang, Hsinchu (TW)

(73) Assignee: Taiwan Semiconductor Manufacturing Company Ltd., Hsinchu (TW)

( * ) Notice: Subject to any disclaimer, the term of this patent is extended or adjusted under 35 U.S.C. 154(b) by 527 days.

(21) Appl. No.: 17/724,182

(22) Filed: Apr. 19, 2022

(65) Prior Publication Data

US 2023/0221892 A1    Jul. 13, 2023

Related U.S. Application Data

(60) Provisional application No. 63/298,833, filed on Jan. 12, 2022.

(51) Int. Cl.
  *G06F 3/00*  (2006.01)
  *G06F 3/06*  (2006.01)

(52) U.S. Cl.
  CPC .......... *G06F 3/0659* (2013.01); *G06F 3/0604* (2013.01); *G06F 3/0679* (2013.01)

(58) Field of Classification Search
  CPC ..... G06F 3/0659; G06F 3/0604; G06F 3/0679
  See application file for complete search history.

(56) References Cited

U.S. PATENT DOCUMENTS

| | | | |
|---|---|---|---|
| 5,826,106 A | 10/1998 | Pang | |
| 5,959,930 A * | 9/1999 | Sakurai | G11C 8/12 365/230.03 |
| 6,055,208 A * | 4/2000 | Morgan | G11C 7/22 365/194 |
| 6,816,750 B1 | 11/2004 | Klaas | |
| 6,842,391 B2 | 1/2005 | Fujioka et al. | |
| 7,411,859 B2 | 8/2008 | Sohn et al. | |
| 8,966,151 B2 | 2/2015 | Zitlaw | |
| 10,380,060 B2 | 8/2019 | Crisp | |
| 10,936,509 B2 | 3/2021 | Robinson et al. | |
| 11,030,103 B2 | 6/2021 | Robinson et al. | |
| 2001/0044875 A1 | 11/2001 | Mailloux et al. | |
| 2010/0153611 A1 | 6/2010 | Rau | |

(Continued)

FOREIGN PATENT DOCUMENTS

| | | |
|---|---|---|
| CN | 110209599 A | 9/2019 |
| CN | 110209601 A | 9/2019 |

(Continued)

*Primary Examiner* — Craig S Goldschmidt
(74) *Attorney, Agent, or Firm* — Merchant & Gould P.C.

(57) ABSTRACT

A memory interface circuit includes a request decoder configured to receive a command signal and an address signal. The request decoder is configured to decode the command signal and the address signal to generate a data count signal and a start address signal. A burst counter is coupled to the request decoder, and the burst counter is configured to update the data count signal after each access of a memory. An address generator is coupled to the request decoder. The address generator is configured to receive the start address signal and generate a subsequent memory address signal based on the start address signal after each access of the memory.

20 Claims, 6 Drawing Sheets

(56) References Cited

U.S. PATENT DOCUMENTS

2017/0110177 A1* 4/2017 Lee .................. G11C 11/40615
2022/0342597 A1* 10/2022 Liu ....................... G06F 3/0688

FOREIGN PATENT DOCUMENTS

| EP | 0 803 816 A2 | 10/1997 |
| KR | 10-2005-0078206 A | 8/2005 |
| KR | 10-2013-0111301 A | 10/2013 |
| KR | 10-2019-0019911 A | 2/2019 |
| TW | 200409120 A | 6/2004 |
| TW | I254211 B | 5/2006 |

* cited by examiner

MEMORY INTERFACE

CROSS REFERENCE TO RELATED APPLICATION

This application claims the benefit of U.S. Provisional Application No. 63/298,833, filed Jan. 12, 2022, and titled "Memory Interface," the disclosure of which is hereby incorporated herein by reference.

BACKGROUND

Fetching data from the physical memory by the system's central processing unit (CPU) is time consuming. The associated data latency includes a long round trip latency of the CPU to transmit an instruction to the memory, and the memory to return the specified data to the CPU. Some data-access applications, such as data base operations, artificial intelligence (AI), big data, etc. often involve significant memory access transactions for search and comparison.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. In addition, the drawings are illustrative as examples of embodiments of the invention and are not intended to be limiting.

DETAILED DESCRIPTION

Figure 1:
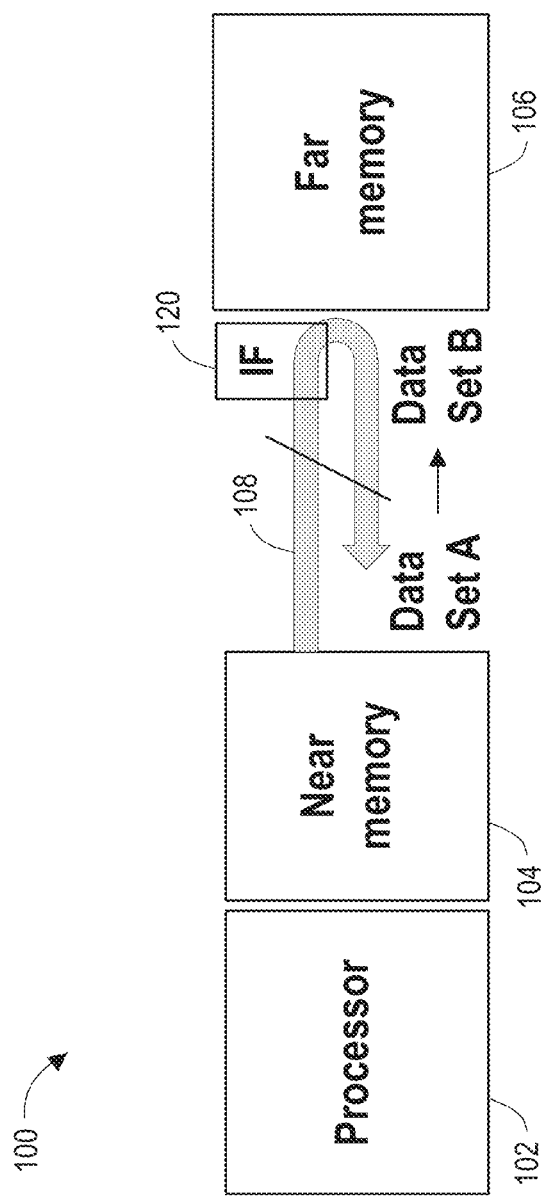
FIG. 1 is a block diagram illustrating an example of a computer system in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Computer systems typically employ various memory arrangements for instruction and data storage. Cache memory may be provided to speed data retrieval operations. Cache memory stores copies of data found in frequently used main memory locations. Accessing data from cache memory speeds processing because cache memory can typically be accessed faster than main memory. Multi-level cache is a structure in which there are multiple cache memories. For example, a computing system may have three levels, i.e. an L1 cache, an L2 cache, and an L3 cache. Typically, in a multi-level cache configuration, L1 is the smallest and with a short access time. If requested data is not found in L1 cache, the system searches the L2 cache, which may be larger than the L1 cache and physically further away than the L1 cache, thus, with a greater access time. If the data are not found in the L2 cache, the L3 cache is searched. However, if requested data is not found in cache memory, then it may be necessary to retrieve the required data from main memory. Many computing processes, such as the intensive data-access applications discussed above may require significant accesses to main memory.

Some computing processes are very memory intensive, requiring many memory accesses for functions such as search and comparison. For instance, Computer artificial intelligence ("AI") uses deep learning techniques, where a computing system may be organized as a neural network. A neural network refers to a plurality of interconnected processing nodes that enable the analysis of data, for example. Neural networks compute "weights" to perform computation on new input data. Neural networks use multiple layers of computational nodes, where deeper layers perform computations based on results of computations performed by higher layers.

Machine learning (ML) involves computer algorithms that may improve automatically through experience and by the use of data. It is seen as a part of artificial intelligence. Machine learning algorithms build a model based on sample data, known as "training data" in order to make predictions or decisions without being explicitly programmed to do so.

Neural networks may include a plurality of interconnected processing nodes that enable the analysis of data to compare an input to such "trained" data. Trained data refers to computational analysis of properties of known data to develop models to use to compare input data. An example of an application of AI and data training is found in object recognition, where a system analyzes the properties of many (e.g., thousands or more) of images to determine patterns that can be used to perform statistical analysis to identify an input object.

Thus, machine learning is very computationally intensive with the computation and comparison of many different data elements, requiring significant memory accesses. Other computer applications, such as database applications including big data also involve many data accesses. In such data intensive operations, data movement can consume a majority of memory access transactions.

Some technologies address latency associated with memory accesses by positioning the memory closer to the processor to speed up the system. "Near-memory computing" moves processing nearer to the memory, reducing the time required for data access. However, data access tasks such as data migration from one data set to another may still require transferring such data sets between near memory and far memory. For instance, data migrations from a data-set A to a data-set B may be executed between application phases. In such examples, all data words transferred have dedicated memory instructions (address, command and data) transmitted. Thus, in addition to transferring the data sets on the memory bus, address and command bits are transferred, which degrades or limits the available effective memory bus bandwidth.

In accordance with aspects of the disclosure, a memory interface circuit is added to a memory, such as random access memory (RAM), that enables switching the memory between fixed length transmission and variable length burst transmission. For processing operations, the memory is operated in a non-burst, fixed length data access mode where each memory access command includes address, memory command and data information. For data transfer or migration operations (e.g. between near and far memory), the variable length burst memory access mode is used. In the burst mode, one address may be sent to the memory, but rather than read/write the data only for the specified address, some number of additional memory locations (typically sequential addresses) are also accessed for read/write operations.

With the burst memory access mode, address and command information bits are eliminated or reduced from some data transfers, potentially providing additional bandwidth for data transmission. In various examples, the memory interface is added for both near and far memory. However, the interface is also applicable for different combinations of interconnects, e.g. near memory to far memory, near memory to near memory, core to core, chip to chip, main memory to cache memory, etc.

FIG. 1 is a block diagram illustrating aspects of a computer system 100 in accordance with aspects of the present disclosure. The computer system 100 includes a processor, a first memory, and a second memory. For example, the processor may be an artificial intelligence (AI) processor 102 that is configured to interface with the first memory 104 (e.g. near memory) and the second memory 106 (e.g. far memory). The processor 102 could be any type of processing device that accesses data stored in a memory, such as a microprocessor, a digital signal processor, an application-specific integrated circuit, a field programmable gate array, etc. For typical processing operations, the processor 102 accesses the near memory 104. As discussed above, the near memory 104 is located close to the processor 102, which can speed up processing operations.

Some processes require memory data migrations, such as migrating between a first data set A and a second data set B between the near memory 104 and far memory 106. In other words, a data set in the first memory 104 is exchanged with another data set in the second memory 106 over a data bus 108. As illustrated in the example shown in FIG. 1, the data migration is between near memory and far memory. In other examples, data migrations could include main memory to cache memory, core memory to core memory, chip to chip, etc. as noted above, typical data transmissions each include sending and receiving data, address, and command bits on the memory bus 108. In accordance with disclosed aspects, however, for data transfer and migration operations between the first memory 104 and the second memory 106, a memory interface circuit 120 is provided to selectively implement a burst data access mode where address and command bits transmitted on the data bus 108 are reduced or eliminated, providing further bandwidth for transmitting the data sets A and/or B on the data bus 108.

Figure 2:
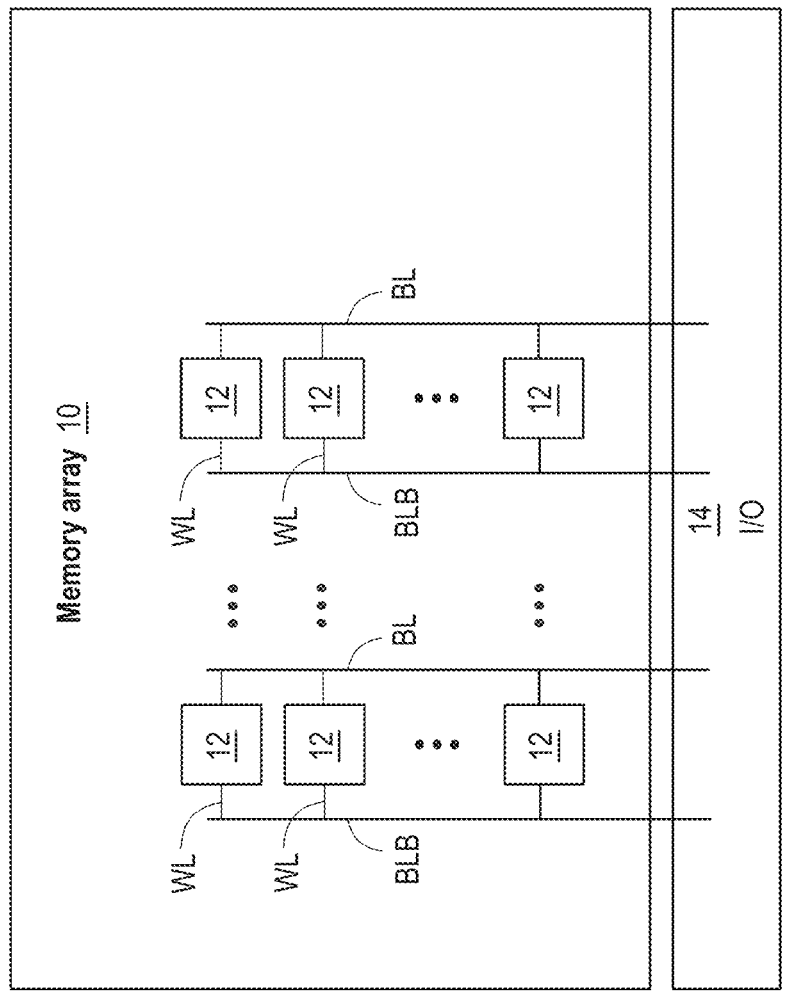
FIG. 2 is a block diagram illustrating an example of a memory array of the computer system shown in FIG. 1 in accordance with some embodiments.

FIG. 2 illustrates an example of a memory suitable for use as the first memory 104 and/or the second memory 106. In the example shown, the memory 104/106 includes one or more memory arrays 10, which include a plurality of memory cells 12, or bit-cells. The memory 104/106 also includes an input/output (I/O) circuit 14 that is connected to the memory interface 110. The memory cells 12 and I/O 14 may be coupled by complementary bit lines BL and BLB, and data can be read from and written to the memory cells 12 via the complementary bit lines BL and BLB.

Figure 3:
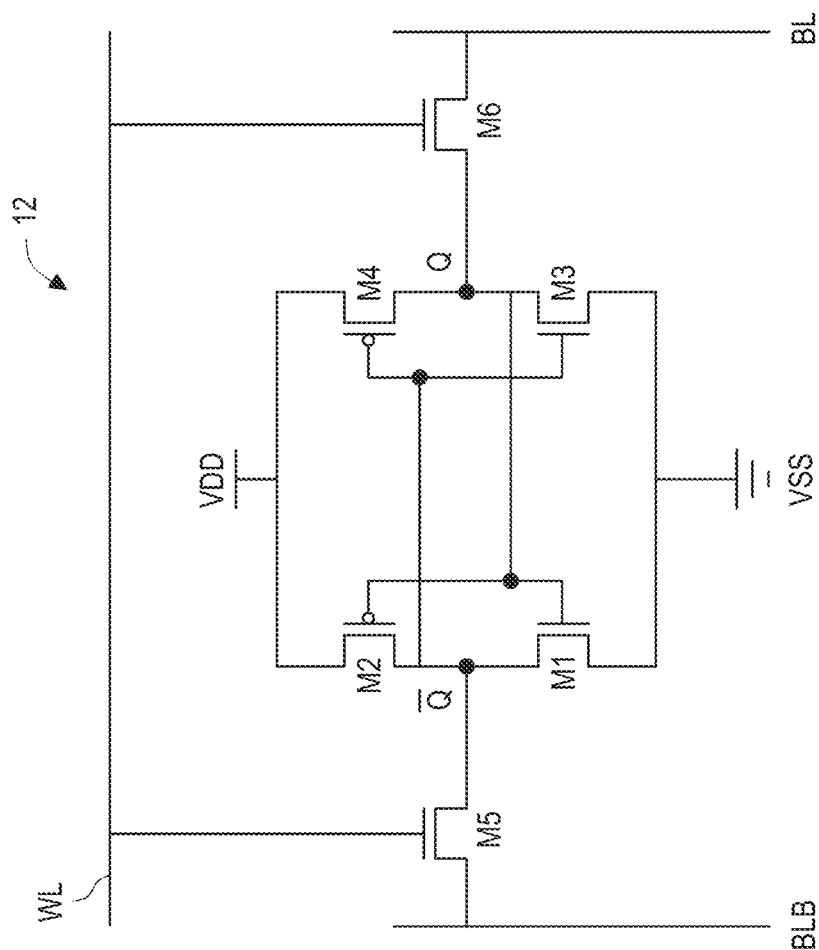
FIG. 3 is a schematic diagram illustrating an example of a memory cell of the memory array shown in FIG. 2 in accordance with some embodiments.

As noted above, in some examples the memory 104/106 is an SRAM memory. In such examples, the memory cells 12 are SRAM cells. FIG. 3 is a circuit diagram illustrating an example SRAM memory cell 12 in accordance with some embodiments. The memory cell 12 includes but is not limited to a six-transistor (6T) SRAM structure. In some embodiments more or fewer than six transistors may be used to implement the memory cell 12. For example, the memory cell 12 in some embodiments may use a 4T, 8T or 10T SRAM structure, and in other embodiments may include a memory-like bit-cell or a building unit. The memory cell 12 includes a first inverter formed by a NMOS/PMOS transistor pair M1 and M2, a second inverter formed by a NMOS/PMOS transistor pair M3 and M4, and access transistors/pass gates M5 and M6. Transistors M1, M3, M5 and M6 include n-type metal-oxide-semiconductor (NMOS) transistors, and transistors M2 and M4 include p-type metal-oxide semiconductor (PMOS) transistors.

The first and second inverters are cross coupled to each other to form a latching circuit for data storage. A first terminal of each of transistors M2 and M4 is coupled to a power supply VDD, while a first terminal of each of transistors M1 and M3 is coupled to a reference Voltage VSS, for example, ground. A gate of the pass gate transistor M6 is coupled to a word line WL. A drain of the pass gate transistor M6 is coupled to a bit line BL. Moreover, a first terminal of the pass gate transistor M6 is coupled to second terminals of transistors M4 and M3 and also to gates of M2 and M1 at the node Q. Similarly, a gate of the pass gate transistor M5 is coupled to the word line WL. A drain of the pass gate transistor M5 is coupled to a complementary bit line BLB. Moreover, a first terminal of the pass gate transistor M5 is coupled to second terminals of transistors M2 and M1 and also to gates of transistors M4 and M3 at the node Qbar.

The memory cells 12 shown in FIG. 2 are not limited to SRAM cells. In other examples, the memory cells 12 may include any suitable memory technology, such as dynamic random access memory (DRAM) cells, FLASH memory cells, electrically erasable programmable read only memory (EEPROM) cells, magnetoresistive random access memory (MRAM) cells, resistive random access (RRAM) cells, or other types of memory cells.

Figure 4:
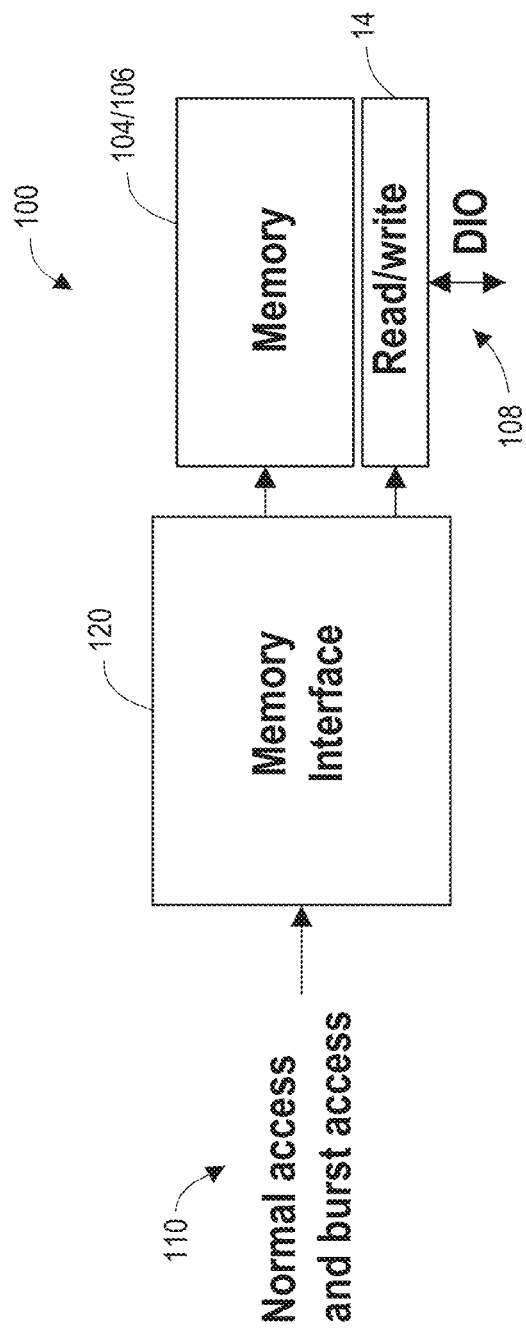
FIG. 4 is a block diagram illustrating aspects of an example memory interface in accordance with some embodiments.

FIG. 4 is a block diagram illustrating further aspects of an example of the computer system 100. The illustrated example includes the memory interface circuit 120 having outputs connected to the memory 104/106. Either or both of the first memory 104 and the second memory 106 may have the memory interface circuit 120 coupled thereto. Accordingly, the first memory 104 and the second memory 106 are collectively referred to herein as the memory 104/106.

The memory interface circuit 120 is configured to selectively implement a burst memory access mode or a non-burst memory access mode as discussed above. As such, the memory interface circuit 120 receives a command 110 selecting between the burst memory access mode and the normal, or non-burst memory access mode. The command 110 further includes a memory operation command (e.g. read, write, burst read, burst write, etc.) and an address command.

Among other things, the memory interface circuit 120 includes an address generator having an output terminal connected to an address input terminal of the memory 104/106. The address generator outputs a first memory address based on a start address signal decoded from the address command portion of the command 110. The memory 104/106 is configured to access this first memory address, and when in the burst memory access mode, thereafter generate a second memory address based on the first memory address at the output terminal. As such, the memory interface 120 determines the next memory address accessed in the memory 104/106.

Since the memory interface 120 generates the next memory address for the burst memory access, and the memory command (read/write) has been provided in the decoded command 110, this information is not required to be transmitted on the data bus 108 for subsequent memory accesses in the burst memory access mode. This provides additional bandwidth for transmission of data read from or written to the memory 104/106.

Figure 5:
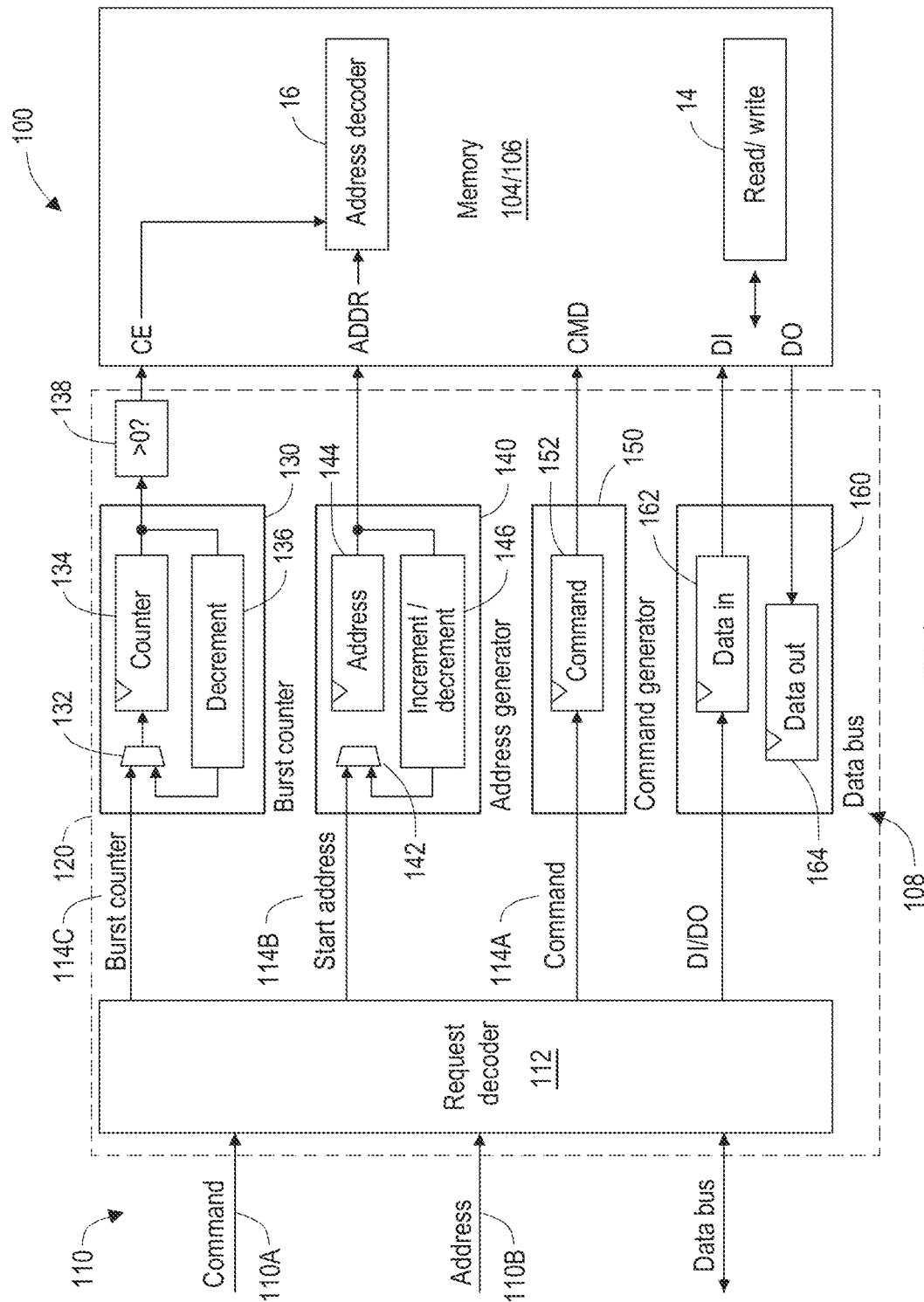
FIG. 5 is a block diagram illustrating further aspects of an example memory interface in accordance with some embodiments.

FIG. 5 is a block diagram illustrating further aspects of an example of the computer system 100. The example shown in FIG. 5 includes further aspects of the memory 104/106, such as a chip enable terminal CE, and address terminal ADDR, a command terminal CMD, a data in terminal DI and a data out terminal DO. In the illustrated example, a logic high signal (i.e. logic 1) received at the CE terminal activates the memory 104/106. In other examples, a low logic signal (i.e. logic 0) at the CE terminal activates the memory 104/106. The ADDR terminal receives an address signal that is provided to an address decoder 16. In response to the inputs received on the CE terminal and the ADDR terminal, the word line WL and bit lines BL/BLB corresponding to the appropriate memory cell(s) 12 of the memory array 10 are activated for read or write operations. Data read from the selected memory cell 12 is output by the I/O 14 to the DO terminal, and data to be written to the selected memory cell 12 received at the DI terminal is provided to the appropriate bit lines BL/BLB by the I/O 14.

The interface circuit 120 includes a request decoder 112, as well as a burst counter circuit 130, an address generator circuit 140, a command generator circuit 150 and a data I/O circuit 160. The command 110 is received by the request decoder 112. As noted above, the command 110 includes a memory operation command signal 110A and an address signal 110B. The request decoder 112 decodes the command 110 to provide signals to the other components of the interface circuit 120. More specifically, the request decoder 112 decodes the address signal 110B to generate a start address signal 114B that is received by the address generator 140.

In the illustrated example, the memory command signal 110A received by the request decoder 112 provides the memory operation to be implemented by the memory 104/106 (i.e. read or write), as well as a selection of the burst memory access mode or the non-burst memory access mode. For example, the memory commands burst read and burst write indicate the burst memory access mode for the read or write memory operation, respectively. On the other hand, the memory commands read and write indicate the non-burst or "normal" memory access mode for the read or write memory operation, respectively.

Based on the command input 110A, the request decoder 112 thus outputs a first data count (i.e. "burst counter") signal 114C to the burst counter circuit 130. As will be discussed further below, the value of the burst counter signal 114C indicates the burst memory access mode or the non-burst memory access mode. The request decoder 112 further decodes the memory operation command 114A from the command input signal 110A, which is output to the command generator circuit 150.

The address generator circuit 140 includes an address multiplexer (MUX) 142, an address register 144, and an address adjust (i.e. increment/decrement) circuit 146 connected to an output terminal of the address register 144. The output terminal of the address register 144 is also connected to the ADDR terminal of the memory 104/106. The start address 114B is received at one input of the address MUX 142, and the second input of the address MUX 142 receives an output of the increment/decrement circuit 146. Initially, the start address 114B generated by the request decoder 112 is output to the address register 144. The output of the address register 144 (initially the start address 114B) is provided to the ADDR terminal of the memory 104/106, and accordingly this memory address is accessed.

In the normal, or non-burst memory access mode, the next command (including a new memory address 110B, memory command 110A, and potentially data) is received.

In the burst memory access mode, however, the memory interface circuit 120 generates the next address for memory access. This reduces the amount of memory address information transmitted over the data bus 108. In some embodiments, the subsequent memory addresses generated by the address circuit 140 are sequential to the initial start address 114B. In other words, the generated second memory address is immediately adjacent the received first, or start address 114B.

In some disclosed embodiments the memory 104/106 includes the memory cells 12 arranged in the array 10 of rows and columns as shown in FIG. 2. The start address 114B (and thus the first address output stored in the address register 144) may identify a first memory cell 12 (i.e. first column) of a given row in the array 10. After data is read from or written to this particular memory cell 112, the address generator circuit 140 may generate a second memory address corresponding to the next memory cell 112 in that given row.

Thus, the first memory address stored in the address register 144 (i.e. the start address 114B) is output to the increment/decrement circuit 146, which increments or decrements the address received from the address register 144 as appropriate. If the start address 114B corresponds to a first column of a given row of the memory array 10, the second address is incremented by the address adjust circuit 146 to correspond to the memory cell 12 at the second column of the given row in the array 10. This generated the second memory address is received by the second input of the address MUX 142, written to the address register 144, and output to the ADDR terminal of the memory 104/106. The second address is further received by the address adjust circuit 146 and incremented to correspond to the third column of the given row in the array 10, and so on to generate the number of memory addresses indicated by the command 110A.

In other examples, if the start address 114B corresponds to a first column of a given row of the memory array 10, the first address is incremented by the address adjust circuit 146 to correspond to the memory cell 12 at the second column of the given row in the array 10 to generate the second memory address. This generated subsequent memory address is received by the second input of the address MUX 142, written to the address register 144, and output to the ADDR terminal of the memory 104/106. The second address is further received by the address adjust circuit 146 and incremented to correspond to the third column of the given row in the array 10, and so on to generate the number of memory addresses indicated by the command 110A.

In other examples, the start address 114B corresponds to a column other than the first column of a given row of the memory array 10. Accordingly, in such examples the second address generated by either incrementing or decrementing the first memory address by the address adjust circuit 146 to correspond to the memory cell 12 at an adjacent column of the given row in the array 10. Again, this generated second memory address is received by the second input of the address MUX 142, written to the address register 144, and output to the ADDR terminal of the memory 104/106. The second address is further received by the address adjust circuit 146 and either incremented or decremented to correspond to the next adjacent column of the given row in the array 10, and so on to generate the number of memory addresses indicated by the command 110A.

The burst counter circuit 130 includes a counter MUX 132, a counter register 134, and a count adjust (i.e. "decrement") circuit 136. Initially, the burst counter signal 114B is received at one input of the burst counter input MUX 132. In the burst memory access mode, the burst counter signal 114C indicates the number of memory addresses to be accessed for the burst memory access based on the received memory command signal 110A. For instance, if a burst memory access is to include 512 memory addresses, the initial burst counter signal 114C received by the MUX 134 is 512. This counter value is stored in the counter register 134, and output to an enable circuit 138. The enable circuit 138 determines whether the counter is greater than 0 (indicating that memory access addresses remain). If the counter value from the counter register 134 is greater than 0, a logic 1 is output to the CE terminal of the memory 104/106. If the counter value is 0 (no memory access addresses remain), a logic 0 is output to the CE terminal of the memory 104/106, disabling it. Note that in embodiments where memory chips having an active low chip enable are employed, these values output to the CE terminal would be reversed.

Following the initial memory access (i.e. corresponding to the received start address 114B), the initial counter value stored in the counter register 134 is received by the count adjust circuit 136, which is configured to decrement the count value by one. Thus, in the example discussed above, the initial counter value of 512 would be decremented to 511 and provided to the second input of the MUX 132. The decremented counter value is then written to the register 134, and so on. Thus, the burst counter circuit 130 is configured to decrement the data count after each access of the memory 104/106.

In some embodiments, if the normal or non-burst memory access mode is selected based on the received command 110A, the initial burst counter signal 114C output by the request decoder 112 would be 1, since only one memory address is accessed in the non-burst access mode.

In other examples, the count adjust circuit 136 may operate differently depending on the particular implementation. As noted previously, in the burst memory access mode, the burst counter signal 114C indicates the number of memory addresses to be accessed for the burst memory access based on the received memory command signal 110A. In alternative embodiments, the initial burst counter signal 114C received by the MUX 134 could be 0, for example. This counter value is stored in the counter register 134, and output to the enable circuit 138. The enable circuit 138 would then determine whether the counter less than the predetermined number of memory addresses to be accessed in the burst transmission. Thus, if the burst memory access is to include 512 memory addresses, The counter register 134 would initially store a 0 value, and the count adjust circuit 136 would count up (i.e. add 1 each iteration) until the enable circuit 138 determines the count has reached the predetermined limit (i.e. 512). In other words, in such an embodiment, if the counter value from the counter register 134 is less than 512, a logic 1 is output to the CE terminal of the memory 104/106. If the counter value reaches 512 (no memory access addresses remain), a logic 0 is output to the CE terminal of the memory 104/106, disabling it. Note that in embodiments where memory chips having an active low chip enable are employed, these values output to the CE terminal would be reversed.

The command generator circuit 150 shown in FIG. 5 includes a command register 152 that receives the memory operation command 114A output by the request decoder 112. In the illustrated example, the memory commands provided to the CMD terminal of the memory 104/106 include read enable (RE) and write enable (WE) commands. In the burst memory access mode, the memory operation (read or write) is the same for each memory address access. As such, memory command information does not need to be transmitted on the data bus 108 for each memory access. This effectively provides additional bandwidth for transmitting data on the data bus 108.

The data I/O circuit 160 includes a data in register 162 and a data out register 164. The data in register 162 receives data on the data bus 108 and is connected to the DI terminal of the memory 116 to provide data to be written to the memory 104/106. The data out register 164 receives data from the DO terminal of the memory 104/106 to store data read therefrom, and output that data to the data bus 108. Data stored in the data out register 164 may be transmitted over the data bus 108 to another memory, such as from the far memory 106 to the near memory 104, or vice versa. Data stored in the data in register 162 may be received over the data bus 108 from another memory, such as from the far memory 106 to the near memory 104, or vice versa.

Figure 6:
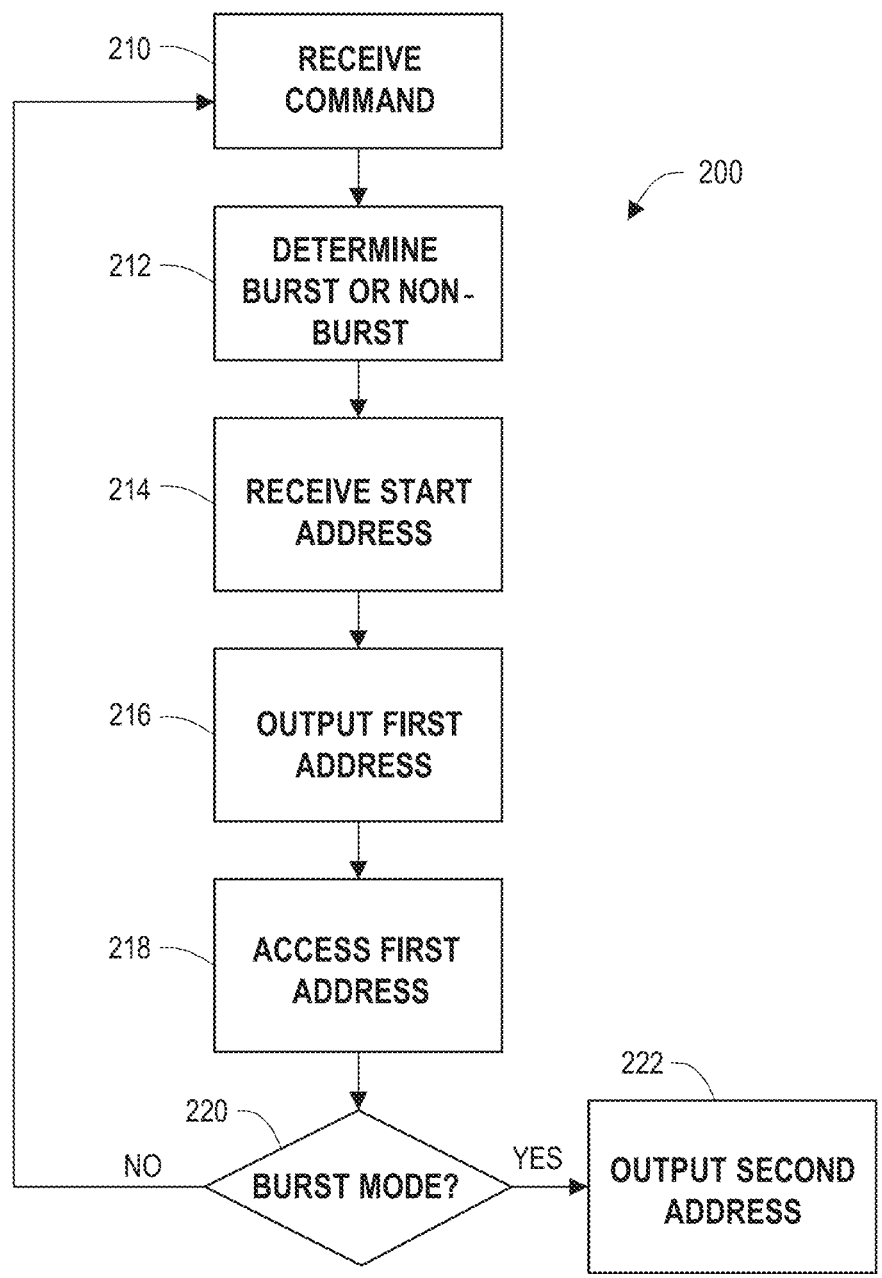
FIG. 6 is a flow diagram illustrating an example of a method in accordance with some embodiments.

FIG. 6 is a flow chart illustrating an example of a method 200 in accordance with aspects of the disclosure. The method 200 may be implemented using aspects of the computer system 100 discussed above and shown in FIGS. 1-5. At block 210, a command signal 114A is received, such as by the command generator circuit 150. Based on the received command signal 100, one of a burst memory access mode or a non-burst memory access mode is determined at block 212. As discussed above regarding the embodiment illustrated in FIG. 5, the burst memory access mode may be indicated based on the initial burst counter 114C value received by the burst counter circuit 130 being greater than 1. If the initial burst counter 114C value is 1, only a single memory access is indicated, in other words the normal or non-burst memory access mode is selected.

At block 214, a start address signal 114B is received, such as by the address generator circuit 140. The start address signal indicates the initial memory address to be accessed for a read or write operation, for example. A first address based on the start address signal 114C is output to an address terminal ADDR of the memory 104/106 at block 260. In some examples, the first address is stored in the address register 144, the output of which is connected to the ADDR terminal of the memory 104/106.

The first address is accessed in block 218 to write data received from a data bus 108 or read data to the data bus 108 based on the command signal 114A. After this memory access, a second address based on the first address is output to the address terminal ADDR of the memory 104/106 in block 222 if it is determined the burst memory access mode is selected in decision block 220. The second address may be determined by incrementing or decrementing the first address.

As noted above, if the burst memory access mode is not selected, only one memory access based on the received start address is executed. Accordingly, if it is determined that the burst memory access mode is not selected in decision block 220, the process returns to block 210 and another command is received.

The method may further include outputting a first data count signal based on the command signal to the CE terminal of the memory 104/106. If the burst memory access mode is selected, a second data count signal is determined based on the first data count signal, such as by decrementing the first data count. This second data count signal is then output to the CE terminal of the memory 104/106 after accessing the first memory address. This continues until the data count signal reaches 0, indicating that no more memory addresses are to be generated for the burst mode memory access.

Accordingly, disclosed examples allow a memory to be switched between a variable length burst transmission mode and a "normal" or non-burst fixed length transmission mode. In the burst mode, address and command information bits are eliminated or reduced from some data transfers, potentially providing additional bandwidth for data transmission. This, in turn, improves performance for intensive data transfer operations such as migrating from one data set to another. In various examples, the memory interface is added for both near and far memory. However, the interface is also applicable for different combinations of interconnects, e.g. near memory to far memory, near memory to near memory, core to core, chip to chip, main memory to cache memory, etc.

Disclosed embodiments thus provide a memory interface circuit that includes a request decoder configured to receive a command signal and an address signal. The request decoder is configured to decode the command signal and the address signal to generate a data count signal and a start address signal. A burst counter is coupled to the request decoder, and the burst counter is configured to update the data count signal after each access of a memory. An address generator is coupled to the request decoder. The address generator is configured to receive the start address signal and generate a subsequent memory address signal based on the start address signal after each access of the memory.

In accordance with further aspects, a memory device includes a memory with a plurality of memory cells arranged in rows and columns. The memory has an address input terminal, a data input terminal and a data output terminal. A data bus is connected to the data input terminal and the data output terminal. The data bus is configured to provide data to be written to the memory and receive data read from the memory. A memory interface circuit is configured to selectively implement a burst memory access mode or a non-burst memory access mode. The memory interface circuit includes an address generator that has an output terminal connected to the address input terminal of the memory. The address generator is configured to receive a start address signal and generate a memory address based on the start address signal at the output terminal. The memory is configured to access the memory address and thereafter, the address generator is configured to generate a second memory address based on the memory address at the output terminal.

In accordance with still further disclosed aspects, a memory interface method includes receiving a command signal and determining one of a burst memory access mode or a non-burst memory access mode. A start address signal is receive, and a first address based on the start address signal is output to an address terminal of the memory. The first address is accessed to write data received from a data bus or read data to the data bus based on the command signal. Thereafter, if the burst memory access mode is selected, a second address based on the first address is output to the address terminal of the memory.

This disclosure outlines various embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
a memory having memory cells;
a request decoder configured to receive a command signal and an address signal, wherein the request decoder is configured to decode the command signal and the address signal to generate a data count signal, a start address signal, and a memory operation command signal;
a burst counter coupled to the request decoder, wherein the burst counter includes:
a multiplexer that has a first input, a second input, and an output, wherein the multiplexer receives the data count signal at the first input and an updated counter data count signal at the second input and selectively provides a multiplexer data count signal at the output;
a counter that receives the multiplexer data count signal and provides a corresponding counter data count signal at a counter output; and
a count adjust circuit that receives the counter data count signal, updates the counter data count signal after each access of the memory, and provides the updated counter data count signal to the second input to be selectively provided at the output after each access of the memory;
an enable circuit configured to receive the counter data count signal after each access of the memory and indicate whether one or more memory access addresses remain after each access of the memory;

an address generator coupled to the request decoder, wherein the address generator is configured to receive the start address signal and generate a subsequent memory address signal based on the start address signal after each access of the memory; and a command generator coupled to the request decoder, wherein the command generator is configured to receive the memory operation command signal and generate a read enable command to read data from one or more of the memory cells if the memory operation command signal includes a read command, and to generate a write enable command to write data into one or more of the memory cells if the memory operation command signal includes a write command.

2. The memory device of claim 1, wherein the burst counter is configured to receive a data count of 1 in the data count signal for a normal, non-burst access, and a data count of greater than 1 for a burst access.

3. The memory device of claim 1, wherein the burst counter is configured to increment the counter data count signal after each access of the memory.

4. The memory device of claim 1, further comprising a data bus coupled to the request decoder, wherein the data bus is configured to selectively output data received from the memory and/or input data to the memory based on the command signal.

5. The memory device of claim 1, wherein the burst counter is configured to decrement the counter data count signal after each access of the memory.

6. The memory device of claim 1, wherein the burst counter is configured for a burst memory access.

7. The memory device of claim 6, wherein the burst memory access includes a plurality of sequential memory addresses.

8. The memory device of claim 6, wherein the start address signal corresponds to a first memory address, and wherein the subsequent memory address signal corresponds to a second memory address.

9. The memory device of claim 6, wherein the address generator is configured to generate the subsequent memory address signal by incrementing or decrementing the start address signal.

10. A memory device, comprising:
a first memory including a plurality of memory cells arranged in rows and columns, the first memory having an address input terminal, a data input terminal and a data output terminal;
a data bus connected to the data input terminal and the data output terminal, wherein the data bus is configured to provide data to be written to the first memory and receive data read from the first memory;
a memory interface circuit configured to selectively implement a burst memory access mode and a non-burst memory access mode, the memory interface circuit is configured to receive a command signal and generate a read enable command to read data from one or more of the plurality of memory cells if the command signal includes a read command and generate a write enable command to write data into one or more of the memory cells if the command signal includes a write command, the memory interface circuit includes an address generator having an output terminal connected to the address input terminal of the first memory, the address generator configured to receive a start address signal and generate a first memory address based on the start address signal at the output terminal, wherein the first memory is configured to access the first memory address in the burst memory access mode and in the non-burst memory access mode, and the address generator is configured to generate a second memory address based on the first memory address at the output terminal in the burst memory access mode, and wherein the memory interface circuit includes a burst counter that includes:
a multiplexer that has a first input, a second input, and an output, wherein the multiplexer receives a data count signal at the first input and an updated counter data count signal at the second input and selectively provides a multiplexer data count signal at the output;
a counter that receives the multiplexer data count signal and provides a corresponding counter data count signal; and
a count adjust circuit that receives the counter data count signal, updates the counter data count signal after each access of the memory, and provides the updated counter data count signal to the second input to be selectively provided at the output after each access of the memory; and
an enable circuit configured to receive the counter data count signal alter each access of the memory and indicate whether one or more memory access addresses remain after each access of the memory.

11. The memory device of claim 10, wherein the address generator is configured to generate the second memory address only in the burst memory access mode.

12. The memory device of claim 10, wherein the first memory address and the second memory address are sequential.

13. The memory device of claim 10, further comprising a second memory wherein the data bus is connected between the first memory and the second memory.

14. The memory device of claim 10, wherein the memory interface circuit includes a request decoder configured to receive an address signal, wherein the request decoder is configured to decode the address signal and output the start address signal to the address generator.

15. The memory device of claim 10, wherein a request decoder is configured to receive the command signal and generate the data count signal based on the command signal.

16. The memory device of claim 15, wherein the data count signal is greater than 1 in the burst memory access mode and the data count signal is 1 in the non-burst memory access mode.

17. A method of operating a memory device, comprising:
receiving a command signal at a request decoder;
decoding the command signal by the request decoder into a data count signal and a memory operation command signal,
generating, by a command generator coupled to the request decoder and front the memory operation command signal, a read enable command to read data from one or more memory cells of a memory of the memory device or a write enable command to write data into the one or more memory cells of the memory;
receiving the data count signal at a first input of a multiplexer in a burst counter;
receiving an updated counter data count signal at a second input of the multiplexer;
selectively providing a multiplexer data count signal at an output of the multiplexer;

receiving the multiplexer data count signal at a counter;
providing a corresponding counter data count signal from the counter;
receiving the counter data count signal at a count adjust circuit;
updating, by the count adjust circuit, the counter data count signal after each access of the memory;
providing the updated counter data count signal to the second input to be selectively provided at the output after each access of the memory;
receiving, by an enable circuit, the counter data count signal after each access of the memory;
indicating, by the enable circuit, whether one or more memory access addresses remain after each access of the memory;
receiving a start address signal;
outputting a first address based on the start address signal to an address terminal of the memory;
accessing the first address to write data received from a data bus into one of the memory cells of the memory or accessing the first address to read data to the data bus from the one of the memory cells of the memory; and thereafter,
in a burst memory access mode, outputting a second address based on the first address to the address terminal of the memory, and
in a non-burst memory access mode, waiting to receive another command signal.

18. The method of claim 17, wherein updating, by the count adjust circuit, the counter data count signal after each access of the memory includes decrementing the counter data count signal after each access of the memory.

19. The method of claim 17, wherein updating by the count adjust circuit, the counter data count signal after each access of the memory includes incrementing the counter data count signal after each access of the memory.

20. The method of claim 17, wherein indicating, by the enable circuit, whether one or more memory access addresses remain after each access of the memory includes providing a logic 1 chip enable signal to the memory.

\* \* \* \* \*